United States Patent [19]

Arikawa

[11] Patent Number: 4,637,664
[45] Date of Patent: Jan. 20, 1987

[54] ANTI-SKID CONTROL APPARATUS FOR A VEHICLE BRAKING SYSTEM

[75] Inventor: Tetsuro Arikawa, Kanagawa, Japan

[73] Assignee: Nippon A B S, Ltd., Kanagawa, Japan

[21] Appl. No.: 760,356

[22] Filed: Jul. 30, 1985

[30] Foreign Application Priority Data

Jul. 31, 1984 [JP] Japan ................ 59-162046

[51] Int. Cl.$^4$ ................ B60T 8/04
[52] U.S. Cl. ................ 303/111; 303/92; 303/113
[58] Field of Search ................ 188/181 A, 181 C; 303/92, 93, 105, 106, 109, 110, 111, 113, 116, 118, 119

[56] References Cited

U.S. PATENT DOCUMENTS

| | | | |
|---|---|---|---|
| 3,674,317 | 7/1972 | Mangold | 303/118 |
| 3,840,277 | 10/1974 | Bouthors | 303/111 |
| 4,313,166 | 1/1982 | Rode et al. | 303/111 X |
| 4,480,876 | 11/1984 | Sato et al. | 303/111 X |

Primary Examiner—Duane A. Reger
Attorney, Agent, or Firm—McDougall, Hersh & Scott

[57] ABSTRACT

In an anti-skid control apparatus for a vehicle braking system including a fluid pressure control valve device arranged between a master cylinder and a wheel cylinder of a brake for the wheel, the fluid pressure control valve device receiving control signals of a control unit measuring the skid condition of the wheel to control the brake fluid pressure to said wheel cylinder; a hydraulic reservoir which, when the brake fluid pressure to the wheel cylinder is decreased with control of the fluid pressure control valve device, reserves the brake fluid discharged through the fluid pressure control valve device from the wheel cylinder; a pressure fluid supply conduit connecting the master cylinder with said fluid pressure control valve device; and a fluid pump for returning the brake fluid from the hydraulic reservoir into the pressure fluid supply conduit; the fluid pressure control valve device is provided for a pair of front wheels, respectively, a valve apparatus receiving fluid pressure of wheel cylinders of the front wheels is arranged between the pair of front wheels and a pair of rear wheels, and when any one of the fluid pressure control valve devices starts to control, at least the fluid pressure of the one of the rear wheels, being at the same side as the one of the front wheels, the fluid pressure of the wheel cylinder of which is lower, is controlled in accordance with the lower one of the fluid pressures of the wheel cylinders of the front wheels by the valve apparatus.

5 Claims, 7 Drawing Figures

ANTI-SKID CONTROL APPARATUS FOR A VEHICLE BRAKING SYSTEM

BACKGROUND OF THE INVENTION

1. Field of the Invention

This invention relates to a anti-skid control apparatus for a vehicle braking system which can prevent the locking of the wheels.

2. Description of the Prior Art

Such an anti-skid control apparatus for a vehicle braking system is known that includes a fluid pressure control valve device arranged between a master cylinder and a wheel cylinder of a brake for the wheel, said fluid pressure control valve device receiving control signals of a control unit measuring the skid condition of the wheel to control the brake fluid pressure to said wheel cylinder; a hydraulic reservoir which, when the brake fluid pressure to said wheel cylinder is decreased with control of said fluid pressure control valve device, reserves the brake fluid discharged through said fluid pressure control valve device from said wheel cylinder; a pressure fluid supply conduit connecting said master cylinder with said fluid pressure control valve device; and a fluid pump for returning the brake fluid from said hydraulic reservoir into said pressure fluid supply conduit.

When the fluid pressure control valve device is provided for each of four wheels, and the fluid pressure of them are independently controlled, there is no problem on control operation. Or when the fluid pressure control valve device is provided for each of front wheels, and for both of rear wheels in common, there is no problem on control operation. In the latter case, the one common fluid pressure control valve device is controlled on the basis of the lower one of the speeds of the rear wheels.

However, in the above cases, there or four fluid pressure control valve devices are used. Accordingly, the whole anti-skid control apparatus is large-sized, and very heavy. Since the fluid pressure control valve device is expensive, it requires high cost.

For example, it is considered that the brake fluid pressures of the front wheels are controlled by the two fluid pressure control valve devices respectively in the diagonal or X-type conduit system, and the brake fluid pressures of the rear wheels are controlled in common with the front wheels. However, when the vehicle runs on the road, the right and left sides of which are considerably different in frictional coefficient from each other, there is the fear that the one rear wheel being diagonal to the one front wheel on the higher frictional coefficient side is locked. In that case, the steering of the vehicle becomes unstable, and that is very dangerous.

Further, it is considered that proportioning valves are provided for the rear wheels, respectively. However, the brake fluid pressures of the rear wheels increases in proportion to the input fluid preSssures to the proportioning valves. The fear of locking cannot be avoided.

SUMMARY OF THE INVENTION

Accordingly, it is an object of this invention to provide an anti-skid control apparatus for a vehicle braking system which can be small-sized and light, and can avoid the fear of locking of rear wheels.

In accordance with an aspect of this invention, in an anti-skid control apparatus for a vehicle braking system including: a fluid pressure control valve device arranged between a master cylinder and a wheel cylinder of a brake for the wheel, said fluid pressure control valve device receiving control signals of a control unit measuring the skid condition of the wheel to control he brake fluid pressure to said wheel cylinder; a hydraulic reservoir which, when the brake fluid pressure to said wheel cylinder is decreased with control of said fluid pressure control valve device, reserves the brake fluid discharged through said fluid pressure control valve device from said wheel cylinder; a pressure fluid supply conduit connecting said master cylinder with said fluid pressure control valve device; and a fluid pump for returning the brake fluid from said hydraulic reservoir into said pressure fluid supply conduit; said fluid pressure control valve device is provided for a pair of front wheels, respectively, a valve apparatus receiving fluid pressures of wheel cylinders of said front wheels is arranged between said pair of front wheels and a pair of rear wheels, and when any one of said fluid pressure control valve devices starts to control, at least the fluid pressure of the one of said rear wheels, being at the same side as the one of said front wheels, the fluid pressure of the wheel cylinder of which is lower, is controlled in accordance with the lower one of the fluid pressures of the wheel cylinders of said front wheels by said valve apparatus.

The foregoing and other objects, features, and advantages of the present invention will be more readily understood upon consideration of the following detailed description of the preferred embodiments of the invention, taken in conjunction with the accompanying drawings.

DESCRIPTION OF THE PREFERRED EMBODIMENTS

Figure 1:
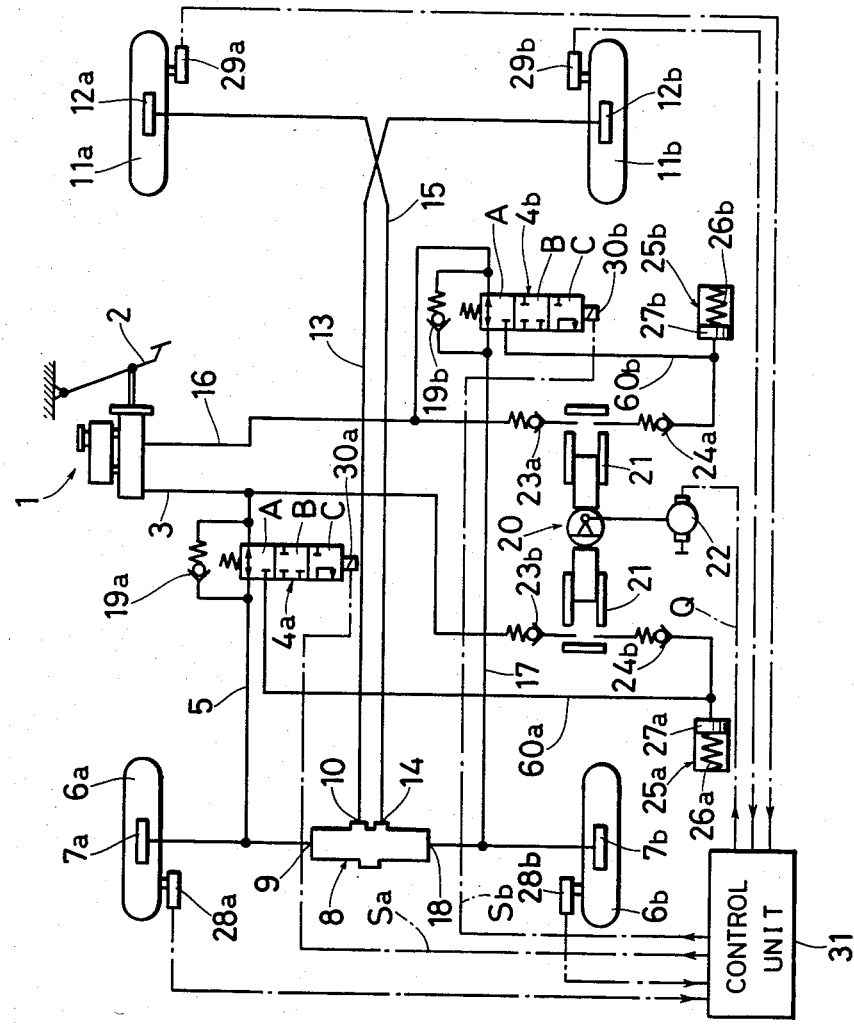
FIG. 1 is a schematic view of a anti-skid control apparatus according to a first embodiment of this invention.
Figure 2:
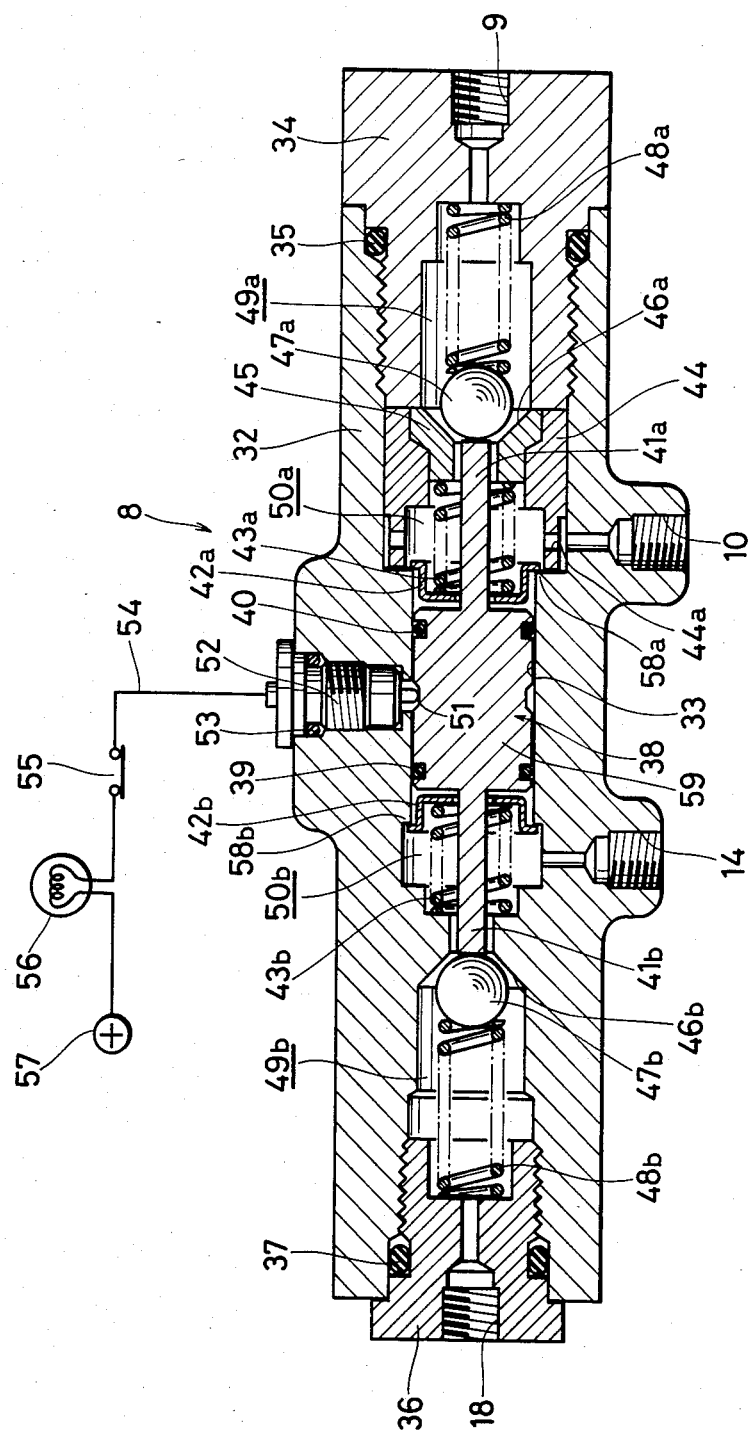
FIG. 2 is an enlarged cross-sectional view of a valve apparatus in FIG. 1.

FIG. 1 and FIG. 2 show an anti-skid apparatus for a vehicle braking system according to a first embodiment of this invention.

In FIG. 1, a brake pedal 2 is connected to a tandem master cylinder. One fluid pressure chamber of the tandem master cylinder 1 is connected to a wheel cylinder 7a of a right front wheel 6a through a conduit 3, an electro-magnetic three position valve 4a and a conduit 5. The conduit 5 is further connected to a first input port 9 of a valve apparatus 8 to be hereinafter described in detail. The first input port 9 normally communicates with a first output port 10 in the valve apparatus 8. The first output port 10 is connected to a wheel cylinder 12b of a left rear wheel 11b through a conduit 13.

Another fluid pressure chamber of the tandem master cylinder 1 is connected to a wheel cylinder 7b of a left front wheel 6b through a conduit 16, an electro-magnetic three position valve 4b and a conduit 17. The conduit 17 is further connected to a second input port 18 of the valve apparatus 8. The second input port 18 normally communicates with a second output port 14 in the valve apparatus 8. The second output port 24 is connected to a wheel cylinder 12a of a right rear wheel 11a through a conduit 15.

Discharge openings of the three position valves 4a and 4b are connected through conduits 60a and 60b to hydraulic reservoirs 25a and 25b, respectively. The hydraulic reservoirs 25a and 25b include pistons 27a and 27b slidably fitted to a casing and relatively weak springs 26a and 26b. Reserving chambers of the reservoirs 25a and 25b are connected to suction openings of a fluid pressure pump 20.

Although the fluid pressure pump 20 is schematically shown, it consists of a pair of casings 21, pistons slidably fitted to the casings 21, an electro-motor 22 reciprocating the pistons, and check valves 23a, 23b, 24a, 24b. Supply openings of the fluid pressure pump 20, or the sides of the check valves 23a, 23b are connected to the conduits 3 and 16.

Wheel speed sensors 28a, 28b, 29a and 29b are associated with the wheels 6a, 6b, 11a and 11b respectively, and they generate pulse signals having frequencies proportional to the rotational speeds of the wheels 6a, 6b, 11a and 11b. The pulse signals of the wheel speed sensors are supplied to a control unit 31 which has the well-known circuits. On the basis of the detecting outputs of the wheel speed sensors 28a, 28b, 29a, and 29b the skid condition or rotational condition of the wheels, namely wheel speeds of the wheels, approximate vehicle speed, slips thereof, and accelerations or decelerations thereof are calculated or measured by the control unit 31. Control signals Sa and Sb as the calculation or measurement results are generated from the control unit 31, and are supplied to solenoid portions 30a and 30b of the valves 4a and 4b. Dash lines represent electric lead wires.

Although schematically shown, the electromagnetic valves 4a and 4b have well-known constructions. When the control signals Sa and Sb are "0", the valves 15a and 15b take first positions A for increasing the brake pressure to the brake for the wheel, respectively. In the first position A, the master cylinder side and the wheel cylinder side are made to communicate with each other. When the control signals Sa and Sb are "½", the valves 4a and 4b take second positions B for maintaining the brake pressure to the brake at constant, respectively. In the second position B, the communications between the master cylinder side and the wheel cylinder side, and between the wheel cylinder side and the reservoir side are interrupted. When the control signals Sa and Sb are "1", the valves 4a and 4b take third positions C for decreasing the brake pressure to the brake, respectively. In the third position C, the communication between the master cylinder side and the wheel cylinder side is interrupted, while the communication between the wheel cylinder side and the reservoir side is made. The brake fluid is discharged through the conduit 60a and 60b into the reservoir 25a and 25b from the wheel cylinders 7a, 7b and 12a and 12b.

The control unit 31 further generates a drive signal Q for the motor 22. when anyone of the control signals Sa and Sb becomes initially "½" or "1", the drive signal Q is generated, and it is kept during the skid control operation. The drive signal Q is supplied to the motor 22.

Next, the details of the valve apparatus 8, to which the brake fluid pressures are applied from the wheel cylinders 7a and 7b of the front wheels 6a and 6b, will be described with reference to FIG. 2.

A stepped through hole 33 is axially formed in a casing 32 for the Valve apparatus 8. A cover member 34 provided with a seal ring 35 is screwed to a right opening portion of the casing 32. Another cover member 36 provided with a seal ring 37 is screwed to a left opening portion of the casing 32. The above described first and second input ports 9 and 18 are formed in the cover members 34 and 36, respectively.

A piston 38 provided with seal rings 39 and 40 is slidably fitted to a central portion of the stepped hole 33. Rod portions 41a and 41b of the piston 38 normally contact with valve balls 47a and 47b across output chambers 50a and 50b, respectively. The valve balls 47a and 47b are positioned in input chambers 49a and 49b, and are urged towards valves seats 46a and 46b by springs 48a and 48b. The one valve seat 46b is formed in the inner wall of the casing 32. The other valve seat 46a is formed in a valve forming member 45 which is pressedly fitted to a cylindrical member 44. The above output chamber 50a is inside of the cylindrical member 44, and it communicates through holes 44a made in the circumferential wall portion, with the first output port 10. The other output chamber 50b communicates directly with the second output port 14.

Spring receiving rings 42a and 42b are slidably fitted to the rod portions 41a and 41b of the piston 38 for receiving springs 43a and 43b. They are urged towards the center by the springs 43a and 43b. Normally, flange portions of the spring receiving rings 42a and 2b contact with stepped portions 58a and 58b of the casing 32. There are little gaps between the spring receiving rings 42a, 42b and a main portion 59 of the piston 38. Thus, the neutral position of the piston 38 is determined in the stepped hole 33.

A switch 52 provided with a seal ring 53 is tightly fitted into a hole made in the central wall of the casing 32. An actuator of the switch 52 is engaged with a groove 51 made in the circumference of the piston 38, in the neutral position. An electric wire 54 from the switch 52 is connected through a contact 55 of a b-contact type relay, and a warning lamp 56 to a positive terminal of a battery 57. The warning lamp 56 is energized, when the contact 55 remains closed and the switch 55 is operated. The contact 55 of the b-contact type relay normally closes, and when the anti-skid apparatus of FIG. 1 operates in order, it is opened. For example, when the fluid pressure pump 20 operates, it is opened.

In the shown neutral position of the piston 38, the valve balls 47a and 47b are separated from the valve seats 46a and 46b by the rod portions 41a and 41b. The input chambers 49a and 49b are made to communicate with the output chambers 50a and 50b.

In FIG. 1, check valves 19a and 19b are connected in parallel with the electromagnetic valves 4a and 4b. They permit brake fluid to flow only in the direction from the wheel cylinder side towards the master cylinder side. Both sides of the valves 4a and 4b communicate with each other through throttling holes in the A-position. Accordingly, pressurized fluid is rapidly returned through the check valves 19a and 19b to the master cylinder 1 from the wheel cylinders 7a, 7b, 12a and 12b, when the brake is released.

Next, there will be described operations of the above described anti-skid apparatus.

It is now assumed that the wheels 6a, 6b, 11a and 11b run on the road which is uniform in frictional coefficient.

The vehicle driver treads the brake pedal 2. At the beginning of the braking, the control signals Sa and Sb are "0" from the control unit 31. Accordingly, the valves 4a and 4b are in the A-position. Pressurized fluid is supplied from the master cylinder 1 to the wheel cylinders 7a and 7b of the front wheels 6a and 6b through the conduits 3, 16, the valves 4a, 4b and the conduits 5, 17. Further, it is supplied to the wheel cylinders 12a and 12b of the rear wheels 11a and 11b through the first and second input ports 9, 18, the input chambers 49a, 49b, the output chambers 50a, 50b, the first and second output ports 10, 14 in the valve apparatus 8, and the conduits 13 and 15. Thus, the wheels 6a, 6b, 11a and 11b are braked.

When the deceleration or slip ratio of the wheels 6a, 6b, 11a and 11b becomes higher than the predetermined deceleration or slip ratio with the increase of the brake fluid pressure, the control signals Sa and Sb become high level "1". The solenoid portions 30a and 30b are energized. The valves 4a and 4b take the third position C. The conduits 3 and 16 are interrupted from the conduits 5 and 17, respectively. However, the conduits 5 and 17 are made to communicate with the conduits 60a and 60b. The pressurized fluid is discharged from the wheel cylinders 7a and 7b of the front wheels 6a and 6b into the hydraulic reservoirs 25a and 25b through the conduits 5, 17, 60a and 60b. The pressurized fluid from the wheel cylinders 12a and 12b of the rear wheels 11a and 11b is discharged through the conduits 15, 13, the output ports 14, 10, the output chambers 50a, 50b, the input chambers 49a, 49b, the input ports 18, 9 in the valve apparatus 8, and the conduits 17, 5, 60a and 60b, into the hydraulic reservoirs 25a and 25b. Thus, the brakes of the wheels 6a, 6b, 11a and 11b are relieved.

The brake fluid is sucked from the reservoirs 25a and 25b and supplied towards the conduits 3 and 16, nearly at the same rate by the fluid pressure pump 20. Accordingly, the fluid pressures at both sides of the piston 38 are decreased nearly at the same rate. The piston 38 remains stopped at the neutral position, and the valve balls 47a and 47b remain separated from the valve seats 46a and 46b.

According to the control unit 31 of this embodiment, when the deceleration of the wheels 6a and 6b becomes lower than the predetermined deceleration, the control signals Sa and Sb become middle level "½". The valves 4a and 4b take the second position B. The conduits 3, 16 are interrupted the second position B. from the conduits 5, 17. Further, the conduits 5, 17 are interrupted from the conduits 60a, 60b. Thus the brake fluid pressures of the wheel cylinders 7a, 7b, 12a and 12b are maintained at constant.

When the skid conditions of the wheels 6a, 6b, 11a and 11b are removed, the control signals Sa and Sb become again low level "0". The valves 4a and 4b take the position A. The master cylinder side is made to communicate with the wheel cylinder side. The braking forces to the wheels 6a, 6b, 11a and 11b increase.

Hereafter, the above-described operations are repeated. When the running speed of the vehicle reaches the desired speed, or when the vehicle stops, the brake pedal 2 is released from treading. The brake fluid is returned from the wheel cylinders 7a, 7b, 12a and 12b to the master cylinder 1 through the conduits, the valve apparatus 8, the valves 4a, 4b, the check valves 19a and 19b.

In the above description, the control signals Sa and Sb become "0", "1" or "½" at the same time. However, when the frictional coefficients of the road are considerably different at the right and left sides, the control signals Sa and Sb do not become "0", "1", or "½" at the same time. For example, when the frictional coefficient of the right side of the road is relatively small, the control signal Sa first becomes "1". Next, such a case will be described.

The operations at the beginning of the braking are the same as above described. When the control signal Sa becomes "1", the valve 4a takes the position C. Pressurized fluid is discharged into the reservoir 25a from the wheel cylinders 7a and 12b.

In the valve apparatus 8, the fluid pressure is decreased in the input and output chambers 49a and 50a at the right side of the piston 38. On the other hand, the brake fluid continues to be supplied to the wheel cylinders 7b and 12a from the master cylinder 1. Accordingly, the rightward pushing force to the piston 38 becomes larger. The piston 38 is moved rightwards. Thus, the left valve ball 47b comes to seat the valve 46b by spring action of the spring 48b. On the other hand, the right valve ball 47a is further separated from the valve seat 46a by the rod portion 41a. The right input chamber 49a remains communicating with the right output chamber 50a, while the left input chamber 49b is interrupted from the left output chamber 50b. Thus, the fluid supply to the wheel cylinder 12a of the one rear wheel 11a is interrupted from the master cylinder 1.

When the piston 38 is further moved rightwards with the decrease of the fluid pressure of the right input and output chambers 49a and 50a, the volume of the left output chamber 50b interrupted from the left input chamber 49b is increased. In other words, the fluid pressure of the wheel cylinder 12a of the rear wheel 11a is lowered since the wheel cylinder 12a communicates with the left output chamber 50b through the output port 14 and the conduit 15.

When the control signal Sa becomes again "0" to increase the fluid pressure of the input and output chambers 49a and 50a, the piston 38 is moved leftwards to decrease the volume of the left output chamber 50b, while the left valve ball 47b seats the valve seat 46b. Thus, the brake fluid pressure of the wheel cylinder 12a of the rear wheel 11a is again increased. The above-described operation means that the brake fluid pressure of the wheel cylinder 12a of the rear wheel 11a at the same side as the front wheel 6a is controlled in accordance with the brake fluid pressure of the wheel cylinders 7a of the front wheel 6a. Thus, the rear wheel 11a running on the lower frictional coefficient side of the road is prevented from locking, similarly to the front wheel 6a at the same side. If the brake fluid pressure of the wheel cylinder 12a of the rear wheel 11a is controlled in common with the brake fluid pressure of the wheel cylinder 7b of the front wheel 6b running on the higher frictional coefficient side, the rear wheel 11a would be locked.

Next, there will be described the case that one of the two conduit systems fails.

For example, when brake fluid leaks from the one conduit system including the conduit 3, the fluid pressures of the wheel cylinders 7a ad 12b do not increase by treading the brake pedal 2. On the other hand, the fluid pressure of the other conduit system including the conduit 16 increases by treading the brake pedal 2. Accordingly, the piston 38 is moved rightwards in the valve apparatus 8. Since the anti-skid control is not effected, the contact 55 remains closed. The switch 52 is actuated with the movement of the piston 38. Electric current flows through the warning lamp 56 from the battery 57. The warning lamp 56 lights. Thus, the vehicle driver knows that the anti-skid apparatus fails. When the anti-skid apparatus does not fail, the contact 55 is opened with the beginning of the anti-skid control operation (for example, the beginning of the drive of the fluid pressure pump 20). Accordingly, the warning lamp 56 does not light with the movement of the piston 38.

Next, anti-skid control apparatus according to a second embodiment of this invention will be described with reference to FIG. 3 and FIG. 4. Parts in FIG. 3 and FIG. 4 which correspond to those in FIG. 1 and FIG. 2, are denoted by the same reference numerals, the description of which will be omitted.

Figure 3:
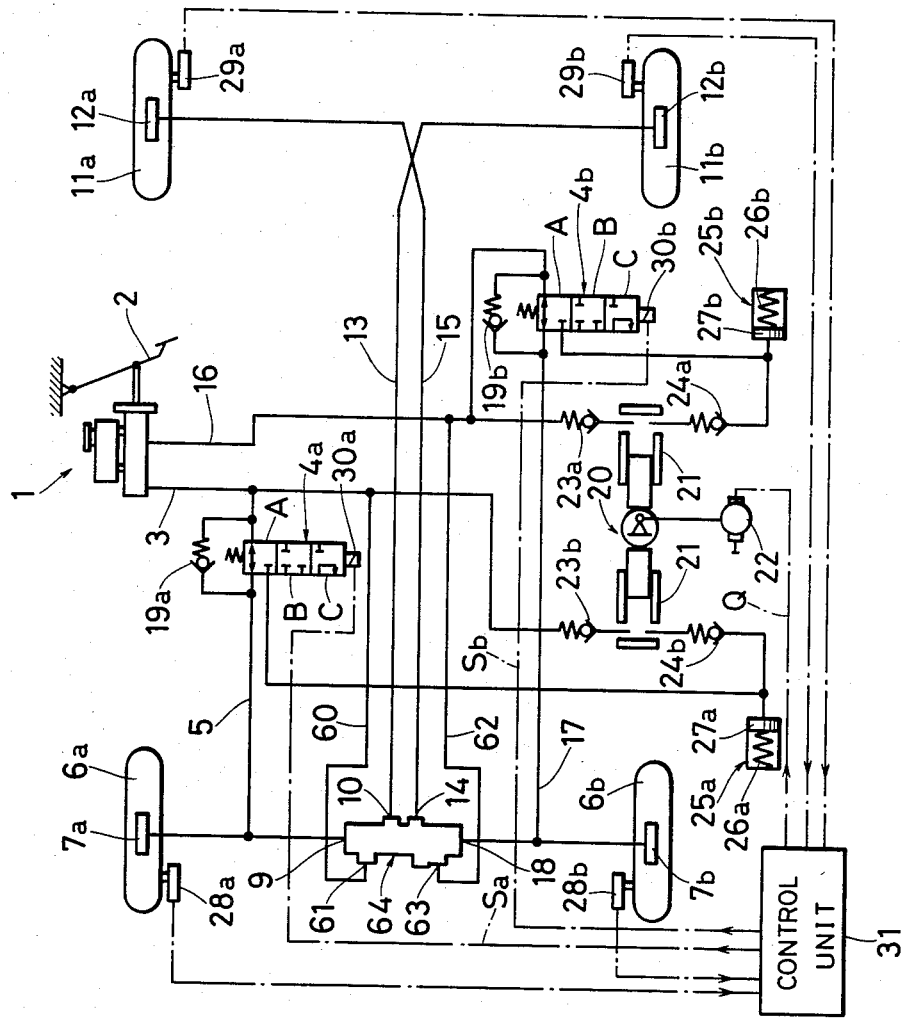
FIG. 3 is a schematic view of a anti-skid control apparatus according to a second embodiment of this invention.

In FIG. 3, conduits 60 and 62 branching from the conduits 3 and 16 are connected to master cylinder pressure input ports 61 and 63 of a valve apparatus 64 respectively.

Figure 4:
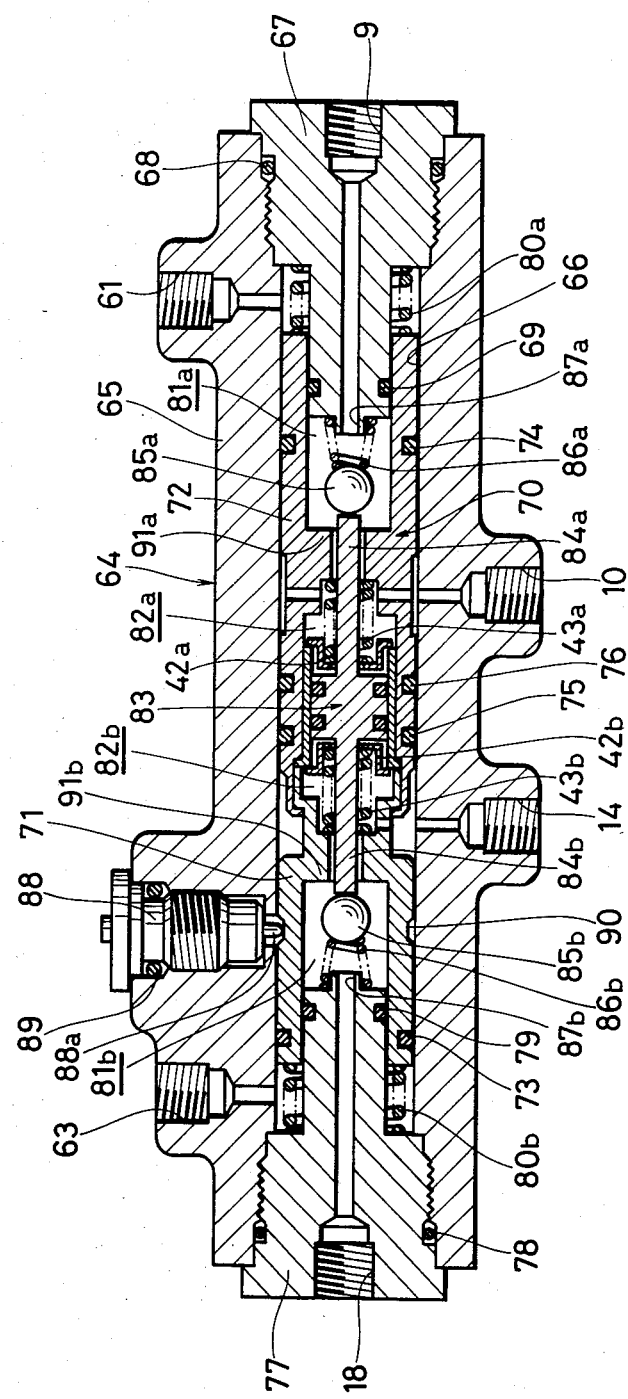
FIG. 4 is an enlarged cross-sectional view of a valve apparatus in FIG. 3.

In FIG. 4, an axial through hole 66 is made in a casing 65 for the valve apparatus 64. A fail detecting sleeve 70 provided with seal rings 73 to 76 are slidably fitted to the axial through hole 66. The fail detecting sleeve 70 consists of two sleeve members 71 and 72 fixed to each other. Plug members 67 and 77 with seal rings 68 and 78 are screwed to openings of the through hole 66. Small diameter portions of the plug members 67 and 77 with seal rings 69 and 70 are tightly fitted to the sleeve 70.

Springs 80a and 80b in compression are arranged between the stepped portions of the plug members 67 and 77, and the end surfaces of the sleeve 70. Normally, the sleeve 70 is located at the shown neutral position. Master cylinder pressures applied to the end surfaces of the sleeve 70 through the master cylinder pressure input ports 61 and 63 are nearly equal to each other, provided that the two conduit systems are in good order.

A piston 83 is slidably fitted to a central portion of the sleeve 70. Rod portions 84a and 84b of the piston 83 are normally contacting with valve balls 85a and 85b. As in the first embodiment, input chambers 81a and 81b, and output chambers 82a and 82b are formed at both sides of the piston 83. The valve balls 85a and 85b are urged towards the rod portions 84a and 84b by springs 86a and 86b, and are facing to annular projections 87a and 87b of the plug members 67 and 77, spaced by a predetermined distance from the latter. Step portions 91a and 91b of the inside wall of the sleeve 70 function as valve seats for the valve balls 85a and 85b.

A switch 88 provided with a seal ring 89 is screwed into a hole made in the upper wall of the casing 65. Normally an actuator 88a of the switch 88 is engaging with a annular groove 90 made in the circumference of the sleeve 70.

When the two conduit systems of the anti-skid control apparatus are in good order, this embodiment operates in the same manner as the first embodiment. Next, there will be described the case that one of the two conduit systems fails.

For example, when the conduit system including the conduit 3 fails, no fluid pressure is generated in the conduits 3, 5 and 60 by treading the pedal 2. On the other hand, some fluid pressure is generated in the conduits 16, 17 and 62. Accordingly, the piston 83 and the sleeve 70 are moved rightwards with the fluid pressure in the valve apparatus 64. The movement of the piston 83 is stopped by contact of the valve ball 85a with the annular projection 87a of the plug member 67. However, the sleeve 70 is further moved rightwards. Thus, the other valve ball 85b is securely separated from the valve seat 91b. In other words, the communication is maintained between the left input and output chambers 81b and 81b, therefore between the ports 18 and 14. Accordingly, the braking forces to the front wheel 6b and rear wheel 11a belonging to the normal conduit system are securely obtained. With the rightward movement of the sleeve 70, the switch 70 turns on to light a not-shown warning lamp, or to energize a not-shown buzzar.

Figure 5:
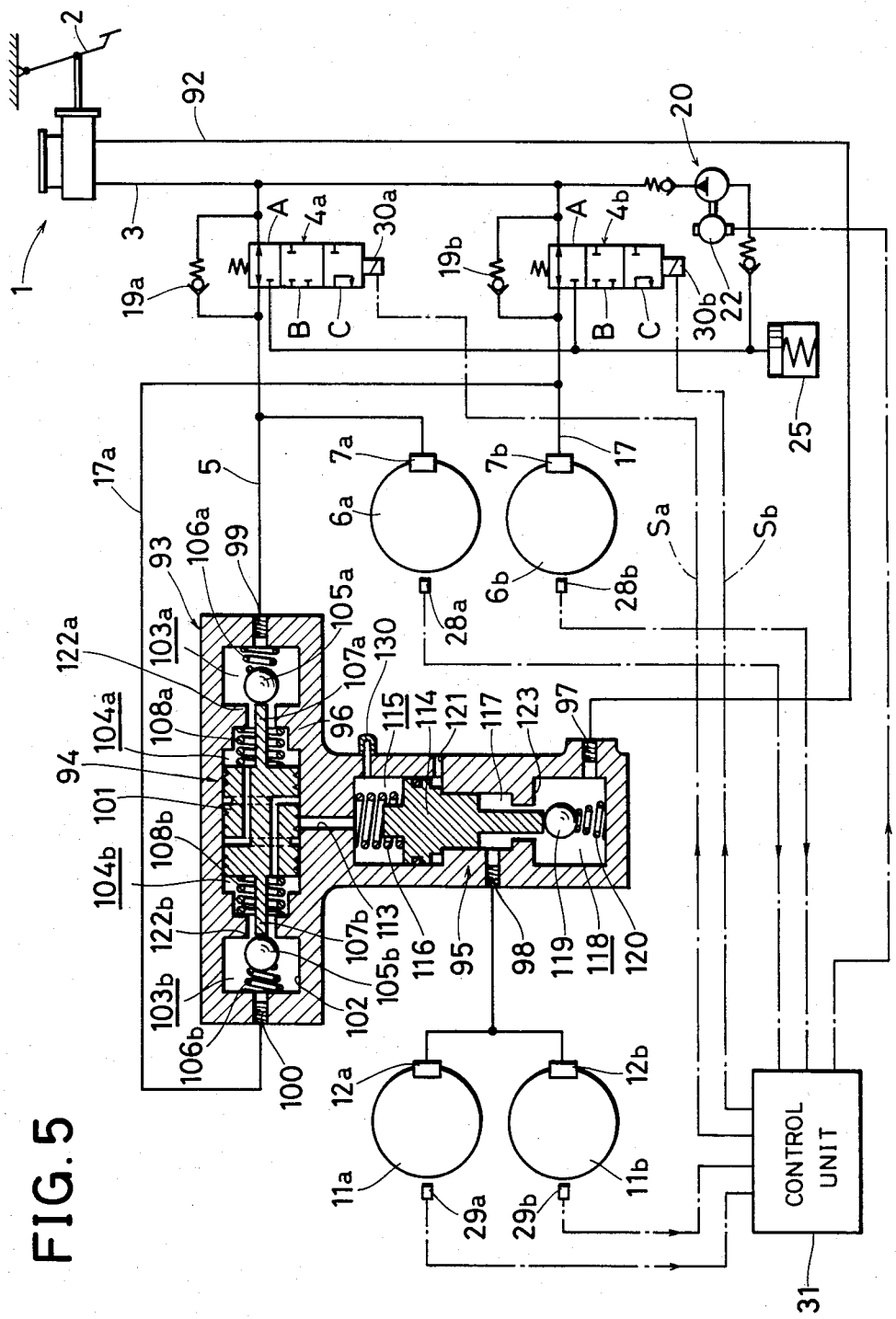
FIG. 5 is a schematic view of a anti-skid control apparatus according to a third embodiment of this invention.

Next, a anti-skid control apparatus according to a third embodiment of this invention will be described with reference to FIG. 5. Parts in FIG. 5 which correspond to those in FIG. 1, are denoted by the same reference numerals, the description of which will be omitted.

The one fluid pressure chamber of the tandem master cylinder 1 is connected to the wheel cylinders and 7b of the front wheels 6a and 6b through the conduit 3, the values 4a, 4b, and the conduits 5 and 7. The other fluid pressure chamber of the tandem master cylinder 1 is connected to the wheel cylinders 12a and 12b of the rear wheels 11a and 11b through a conduit 92 and a second value part 95 of a value apparatus 94 to be hereinafter described in detail. Thus, the front-rear separation connection type or H-connection type is employed for the conduit system of this embodiment. The diagonal connection type or X-connection type is employed for the above first and second embodiments.

The fluid pressure pump 20 is simply shown. However the construction and function are the same as those of the fluid pressure pump shown in FIG. 1 and FIG. 3.

A casing 96 for the valve apparatus 94 is generally T-shaped. A first valve part 94 is arranged in the upper portion of the casing 96, while the second valve part 95 is arranged in the lower portion of the casing 96.

A piston 101 is slidably fitted to a stepped hole 102 of the upper portion of the casing 96. Metal sealing is effected between the piston 101 and the inner wall of the stepped hole 102 at the circumference. Input chambers 104a and 104b are formed at both sides of the piston 101. Rod portions 107a and 107b of the piston 101 at the shown neutral position contact with valve balls 105a and 105b.

The piston 101 is located at the shown neutral position by a pair of springs 108a and 108b. The valve balls 105a and 105b are urged towards the piston 101 by springs 106a and 106b, and they are facing to valve seats 122a and 122b which are formed as stepped portions of the stepped hole 102.

Figure 6:
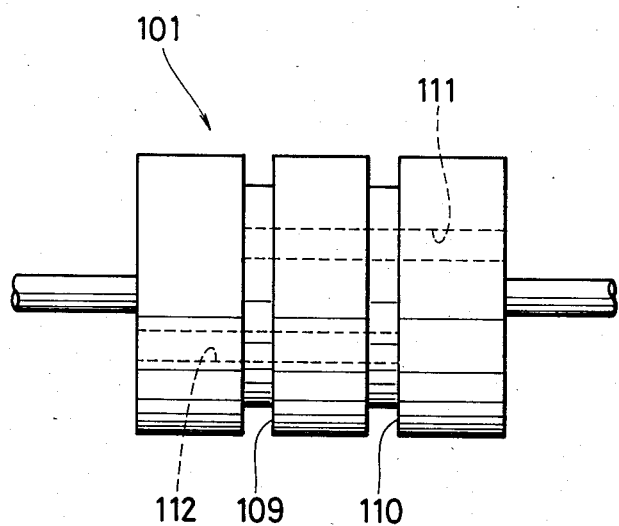
FIG. 6 is enlarged side view of a piston in a valve apparatus in FIG. 5.

Annular grooves 109 and 110 are formed in the piston 101, a shown in FIG. 6, spaced by a predetermined length from each other. Further, L-shaped paths 111 and 112 are formed in it, and they communicate with the annular grooves 109 and 110, respectively, while they are open to the relay chambers 104a and 104b, respectively.

The conduit 5 is connected to one input port 99 of the first valve part 94. A conduit 17a branching from the conduit 17 is connected to another input port 100 of the first valve port 94.

A connecting path 113 is made between the first and second valve parts 94 and 95 in the casing 96. When the piston 101 is moved rightwards and contacts with the one step portion of the inside wall of the casing 96, the connecting path 113 aligns with the one annular groove 109. When the piston 101 is moved leftwards and contacts with the other step portion of the casing 96, the connecting path 113 aligns with the other annular groove 110.

In the second valve part 95, a stepped piston 114 provided with a seal ring is slidably fitted to a stepped hole, and it is urged downwards by a spring 116. A top end portion of the stepped piston 114 contacts with a valve ball 119 which is urged upwards by a spring 120. The valve ball 119 is normally separated from a valve seat 123 which is formed as a stepped portion of the inner wall of the stepped hole. A control chamber 115 and an output chamber 117 are formed at both sides of the stepped piston 114. On air chamber formed under the larger diameter portion of the stepped piston 114 communicates through an opening 121 with the atmosphere. The output chamber 117 is connected through an output port 98 to the wheel cylinders 1a and 12b of the rear wheels 11a and 11b. An input chamber 118 formed under the output chamber 117 is connected through the part 97 and conduit 92 to the master cylinder 1.

Next, there will be described operations of the above described anti-skid control apparatus.

First, there will be described the case that the vehicle runs on the road being uniform in frictional coefficient.

When the brake pedal 2 is trodden, the pressurized fluid from the master cylinder 1 is supplied to the wheel cylinders 7a and 7b of the front wheels 6a and 6b through the conduit 3, valves 4a, 4b and continuous 5 and 15. Further, it is supplied to the wheel cylinders 12a and 12b of the rear wheels 11a and 11b through the conduit 92 and the second valve part 95 of the valve apparatus 93. Thus, the wheels 6a, 6b, 11a and 11b are braked.

The control signals 5a and 5b become "1" with the increase of the brake fluid pressure. The valves 4a and 4b take the position C. The pressurized fluid is discharged from the wheel cylinders 7a and 7b of the front wheels 6a and 6b into the reservoir 25. Thus, the braking force to the front wheels 6a and 6b is decreased. Nearly the same fluid pressure is applied to both sides of the piston 101. Accordingly, the piston 101 is maintained at the shown neutral position. Hereafter, the above-described control operations are repeated for the front wheels 6a and 6b.

Next, there will be described the case that the frictional coefficients of the road are considerably different at the right and left sides.

It is assumed that the frictional coefficient of the right side is lower. The control signal 5a first becomes "1". Accordingly, the fluid pressure of the wheel cylinder 7a of the right front wheel 6a is decreased. There occurs some difference of fluid pressure between the chambers at both sides of the piston 101 in the first valve part 94 of the valve apparatus 93. The piston 101 is moved rightwards, and stopped by the right stepped portion of the inside wall of the casing. The annular groove 109 comes to align with the connecting path 111. The control chamber 115 of the second valve part 95 comes to communicate with the one input chamber 103a of the first valve part 94. Accordingly, the fluid pressure of the control chamber 115 is decreased with that of the wheel cylinder 7a. The piston 114 is moved upwards by the fluid pressure of the input chamber 118 in the second valve part 95. The valve ball 119 comes to seat the valve seat 123. The output chamber 117 is interrupted from the input chamber 118. Accordingly, the braking forces to the rear wheels 11a and 11b are changed with the movement of the piston 114, therefore, the change of the volume of the output chamber 117. Thus, they are controlled in accordance with the braking force to the front wheel 6a which runs on the lower frictional coefficient side of the road. Accordingly, the rear wheel 11a, which similarly runs on the lower frictional coefficient side of the road, is prevented from locking.

Even when the frictional coefficients are nearly equal to each other in the right and lift sides of the road, the control signals 5a and 5b do not actually become concurrently "1", "0" or "½". The rear brake fluid pressures of the rear wheels 112 and 11b are controlled in accordance with the lower one of the brake fluid pressures of the front wheel 6a and 6b.

Fail of one of the two conduit systems has no influence on another of them. For example, when the conduit system including the wheel cylinders 7a and 7b of the front wheels 6a and 6b fails, the piston 114 is not moved in the second valve part 95. The valve ball 119 remains opened. Accordingly, the braking forces to the rear wheels 11a and 11b are secured.

Figure 7:
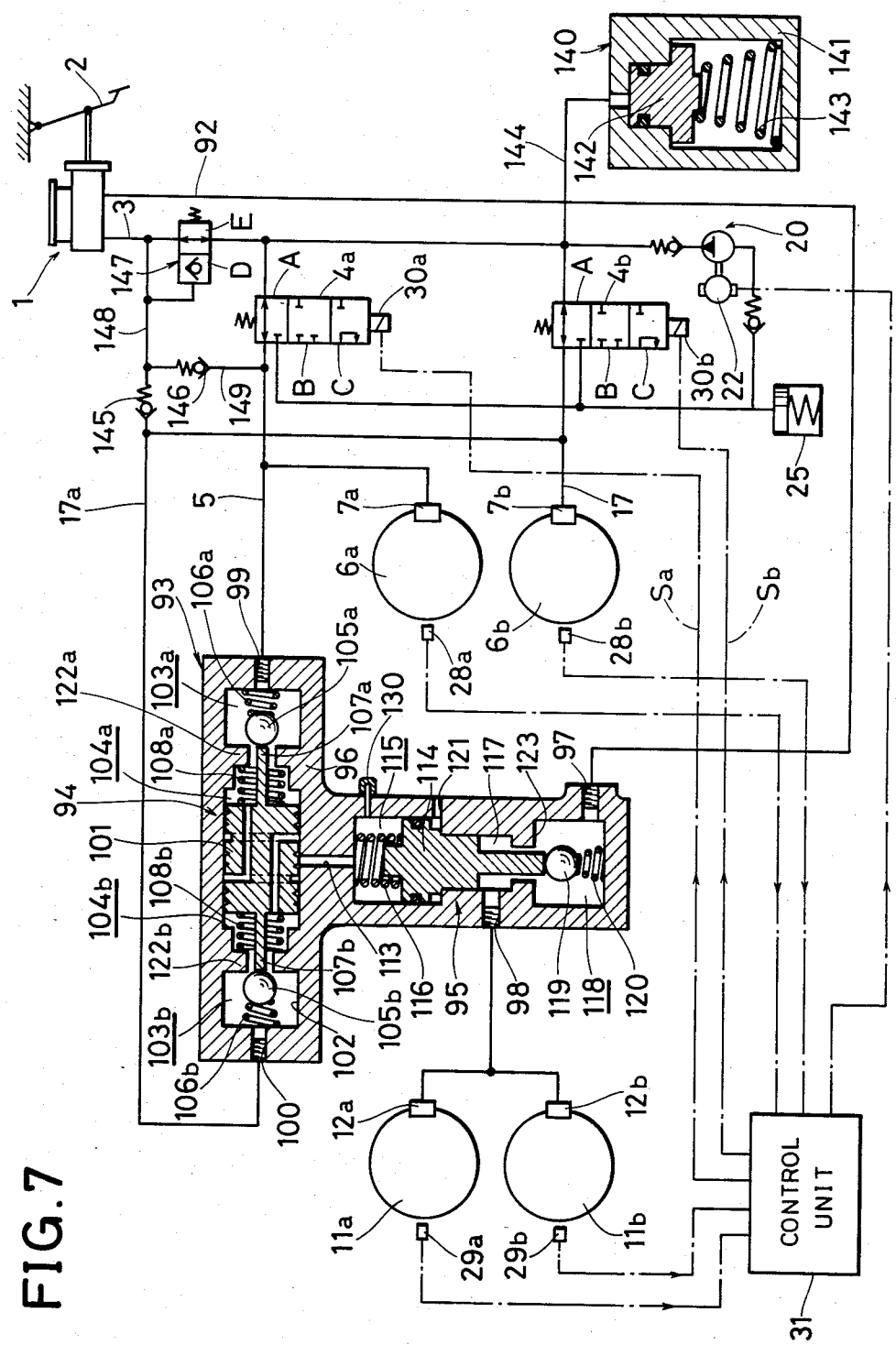
FIG. 7 is a schematic view of a anti-skid control apparatus according to a fourth embodiment of this invention.

Next, an anti-skid control apparatus according to a fourth embodiment of this invention will be described with reference to FIG. 7. Parts in FIG. 7 which correspond to those in FIG. 5, are denoted by the same reference numerals, the description of which will be omitted.

The one fluid pressure chamber of the tandem master cylinder 1 is connected through a check valve apparatus 147 to the valves 4a and 4b. When the fluid pressure of the conduit 3 is lower than a predetermined pressure, the check valve apparatus 147 takes a first position E where the free communication is made between the master cylinder 1 are the valves 4a, 4b. When the fluid pressure of the conduit 3 is higher than the predetermined pressure, the check valve apparatus 147 is changed to a second position D where it permits fluid to flow in the direction from the master cylinder 1 towards the valves 4a, 4b, and it prohibits fluid to flow in the reverse direction.

The conduit 3 is connected to the wheel cylinder 7a of the one front wheel 6a through a conduit 148, a check valve 146 and a conduit 149, while it is connected to the wheel cylinder 7b of the other front wheel 6b through the conduit 148 and another check valve 145. The check valves 145 and 146 permit fluid to flow in the direction from the wheel cylinders 7a and 7b towards the master cylinder 1, while it prohibits fluid to flow in the reverse direction.

The discharge opening of the fluid pressure pump 20 is connected to a hydraulic accumulator 140 through a conduit 144. The accumulator 140 consists of a casing 141, a piston 142 provided with seal ring and slidably fitted to a cylindrical hole of the casing 141 and a relatively strong spring 143 which urges the piston 142 upwards. The pressurized fluid from the fluid pump 20 pushes down the piston 142 against the spring 143, and it is accumulated in the accumulator 140.

According to this embodiment, when the fluid pressure pump 20 starts to operate with the control signals 5a, 5b ("½" or "1"), the pressurized fluid from it is not returned to the master cylinder 1, but it is accumulated in the accumulator 140. Since the check valve apparatus 147 is already changed over to the second position D, the fluid supply to the master cylinder 1 is intercepted. Thus, the so-called "kick back" to the brake pedal 2 can be prevented. The pedal feeling becomes good.

When the control signals 5a, 5b become "0" to change over the valves 4a, 4b to the A-position, the pressurized fluid is supplied to the wheel cylinders 7a and 7b from the accumulator 140 or the master cylinder 1. Thus, the brake is reapplied to the wheels 6a and 6b.

When the brake pedal 2 is released from treading, the pressurized fluid from the wheel cylinders 7a and 7b of the front wheels 6a and 6b is returned to the master cylinder 1 through the check valves 145 and 146, and the conduits 148 and 149. The pressurized fluid from the wheel cylinders 12 and 12b of the rear wheels 11a and 11b is returned through the conduit 92 in the same manner as the third embodiment. When the fluid pressure of the master cylinder 1 becomes lower than the predetermined pressure, the check valve apparatus 147 is changed over to the E-position. Accordingly, hereafer the pressurized fluid is returned also through the check valve apparatus 147. The check valves 145 and generally consist of valve ball and spring. when the fluid pressure of the wheel cylinders become lower than the minimum valve-opening pressure determined by the spring, the fluid cannot return through the check valves 145 and 146. However, since the check valve apparatus 147 has already taken the E-position at that time, the fluid can return through the check valve apparatus 147 to the master cylinder 1. Thus, the fluid can return to the extent that the fluid pressure of the wheel cylinders becomes zero. The other operation of this embodiment is the same as that third embodiment.

While the preferred embodiments have been described, variations thereto will occur to those skilled in the art within the scope of the present inventive concepts which are delineated by the following claims.

What is claimed is:

1. In a skid control apparatus for a vehicle braking system of the type comprising a master cylinder and wheel cylinders associated with front and rear wheels, fluid pressure control valve means arranged between the master cylinder and wheel cylinders, a control unit adapted to sense skid conditions, hydraulic reservoir means, and fluid pump means, the improvement wherein a separate fluid pressure control valve means is provided for each one of a pair of front wheel cylinders, and a valve apparatus arranged between said pair of front wheel cylinders and the cylinders of a pair of rear wheels, said valve apparatus normally being open to fluid pressures applied to all said wheel cylinders through the respective fluid pressure control valve means, and wherein sensing of skid conditions at one front wheel cylinder operates the one fluid pressure control means associated with that front wheel cylinder to vary the fluid pressure to said one front wheel cylinder, and means including said valve apparatus connecting said one fluid pressure control means to one of said rear wheel cylinders to also vary the fluid pressure to said one rear wheel cylinder.

2. An anti-skid control apparatus according to claim 1, in which said valve apparatus comprises a casing, a piston slidably fitted to said casing, input and output chambers formed at both sides of said piston, input ports communicating with said input chambers, respectively, output ports communicating with said output chambers, respectively, and valve members arranged between said input and output chambers, and operated by said piston, wherein one of said input ports is connected to the wheel cylinder of the right front wheel, one of said output ports which communicates with the output chambers being at the same side of said piston as the input chamber communicating said one of the input ports, is connected to the wheel cylinder of the left rear wheel, and wherein the other of said input ports is connected to the wheel cylinder of the left front wheel, the other of said output ports which communicates with the other of said output chambers being at the same side of said piston as the input chamber communicating said other of the input ports, is connected to the wheel cylinder of the right rear wheel.

3. An anti-skid control apparatus according to claim 2, in which a fail detecting switch is engaged with said piston.

4. An anti-skid control apparatus according to claim 2, in which said valve apparatus further comprises a sleeve slidably fitted into said casing, said piston being slidably fitted into said sleeve, and wherein the fluid pressures of two fluid pressure chambers of said master cylinder are applied to both sides of said sleeve, and a fail detecting switch is engaged with said sleeve.

5. An anti-skid control apparatus according to claim 2, in which said valve apparatus consists of a first valve part and second valve part, said first valve part comprises a first casing, a piston slidably fitted to said first casing, input and relay chambers formed at both sides of said piston, input ports communicating with said input chambers, respectively, paths made in said piston communicating with said relay chambers, respectively, and valve members arranged between said input and relay chambers, and operated by said piston, wherein said input ports are connected to the wheel cylinders of said front wheels; said second valve part comprises a second casing, a second piston slidably fitted to said second casing, a control chamber formed at one side of said second piston, output and input chambers formed at another side of said second piston, and a valve member arranged between said output and input chambers, wherein said output chamber is connected to the wheel cylinders of said rear wheels, said input chamber is connected to one fluid pressure chamber of said master cylinder; when said piston is located at a first position, one of said relay chambers communicates with said control chamber through one of said paths and when said piston is located at a second position, the other of said relay chambers communicates with said control chamber through the other of said paths.

* * * * *